United States Patent
Zak et al.

(10) Patent No.: US 11,040,447 B2
(45) Date of Patent: Jun. 22, 2021

(54) SYSTEM AND METHOD FOR ADAPTIVE BIN PICKING FOR MANUFACTURING

(71) Applicants: MAGNA INTERNATIONAL INC., Aurora (CA); Alexander Zak, Troy, MI (US); Dusko Perovski, Macomb, MI (US)

(72) Inventors: Alexander Zak, Troy, MI (US); Dusko Perovski, Macomb, MI (US)

(73) Assignee: MAGNA INTERNATIONAL INC., Aurora (CA)

( * ) Notice: Subject to any disclaimer, the term of this patent is extended or adjusted under 35 U.S.C. 154(b) by 89 days.

(21) Appl. No.: 16/317,876

(22) PCT Filed: Jul. 17, 2017

(86) PCT No.: PCT/US2017/042389
§ 371 (c)(1),
(2) Date: Jan. 15, 2019

(87) PCT Pub. No.: WO2018/014023
PCT Pub. Date: Jan. 18, 2018

(65) Prior Publication Data
US 2019/0232495 A1 Aug. 1, 2019

Related U.S. Application Data

(60) Provisional application No. 62/362,970, filed on Jul. 15, 2016.

(51) Int. Cl.
*B25J 9/16* (2006.01)
*G05B 19/418* (2006.01)
(Continued)

(52) U.S. Cl.
CPC ........... *B25J 9/1664* (2013.01); *B25J 9/1697* (2013.01); *B25J 15/0616* (2013.01);
(Continued)

(58) Field of Classification Search
CPC combination set(s) only.
See application file for complete search history.

(56) References Cited

U.S. PATENT DOCUMENTS 4,613,269 A 9/1986 Wilder et al.
4,790,709 A * 12/1988 Sakimori ........... B65G 47/1478
414/416.01

(Continued)

FOREIGN PATENT DOCUMENTS

CH 693710 A5 12/2003
EP 2221152 A1 8/2010

OTHER PUBLICATIONS

Perez, et al.; Robot Guidance Using Machine Vision Techniques in Industrial Environments: A Comparative Review; Sensors 2016; Mar. 5, 2016; https://www.ncbi.nlm.nih.gov/pmc/articles/PMC4813910/pdf/sensors-16-00335.pdf.

(Continued)

*Primary Examiner* — Kyle O Logan
(74) *Attorney, Agent, or Firm* — Dickinson Wright PLLC

(57) ABSTRACT

A system and method for automatically moving one or more parts between a bin at a source location and a destination using a robot is provided. The system includes a first vision system to identify a part within the bin and to determine the pick location and pick orientation of the part. A second vision system determines the location and orientation of a destination inside or outside of the bin, which may or may not be in a fixed location. A controller plans the best path for the robot to follow in moving the part between the pick location and the destination. An end effector is attached to the robot for picking the part from the bin, holding the part as the robot moves it, and placing the part at the destination. The system may also check the part for quality by one or both of the vision systems.

17 Claims, 1 Drawing Sheet

(51) Int. Cl.
*G06K 9/00* (2006.01)
*G06T 7/73* (2017.01)
*B25J 15/06* (2006.01)
*G05B 19/4155* (2006.01)
*G06T 7/00* (2017.01)
*G06T 7/20* (2017.01)
*H04N 5/247* (2006.01)

(52) U.S. Cl.
CPC ....... *G05B 19/418* (2013.01); *G05B 19/4155* (2013.01); *G06K 9/00771* (2013.01); *G06T 7/0004* (2013.01); *G06T 7/20* (2013.01); *G06T 7/74* (2017.01); *G05B 2219/37555* (2013.01); *G05B 2219/40053* (2013.01); *G05B 2219/40523* (2013.01); *G06T 2207/10012* (2013.01); *G06T 2207/30241* (2013.01); *H04N 5/247* (2013.01)

(56) References Cited

U.S. PATENT DOCUMENTS

| | | |
|---|---|---|
| 5,041,907 A | 8/1991 | Sager et al. |
| 2012/0165986 A1* | 6/2012 | Fuhlbrigge ............ B25J 9/1687 700/259 |
| 2014/0277694 A1 | 9/2014 | Ichimaru |
| 2016/0016311 A1* | 1/2016 | Konolige ............... B25J 9/1612 700/245 |
| 2016/0167227 A1* | 6/2016 | Wellman ................ B25J 9/1612 700/259 |
| 2016/0288331 A1 | 10/2016 | Sivich et al. |

OTHER PUBLICATIONS

Hachour, O.; Path Planning of Autonomous Mobile Robot; International Journal of Systems Applications; Engineering & Development; Issue 4, vol. 2, 2008; http://www.wseas.us/journals/saed/saed-45.pdf.

Perumall, et al.; Automated Trajectory Planner of Industrial Robot for Pick-And-Place Task; International Journal of Advanced Robotic Systems, vol. 10, 2013; http://journals.sagepub.com/doi/pdf/10.5772/53940.

Correll, et al.; Lessons From the Amazon Picking Challenge; Journal of Latex Class Files, vol. 6, No. 1, Jan. 2007; https://arxiv.org/pdf/1601.05484.pdf.

* cited by examiner

SYSTEM AND METHOD FOR ADAPTIVE BIN PICKING FOR MANUFACTURING

CROSS-REFERENCE TO RELATED APPLICATIONS

This U.S. National Stage Patent Application claims the benefit of PCT International Patent Application Serial No. PCT/US2017/042389 filed Jul. 17, 2017 entitled "System And Method For Adaptive Bin Picking For Manufacturing" which claims the benefit of and priority to U.S. Provisional Patent Application Ser. No. 62/362,970 filed Jul. 15, 2016 entitled "System And Method For Adaptive Bin Picking For Manufacturing," the entire disclosures of the applications being considered part of the disclosure of this application and hereby incorporated by reference.

BACKGROUND

Assembly processes (or lines) are implemented to produce a finished good. The finished goods are a combination of various parts that are attached together through various techniques. A finished good may be any sort of object or product, for example, those sold in commerce. An automobile or vehicle, or a part of an automobile or vehicle, may be a finished good produced via an assembly process.

Many finished goods include parts from a variety of sources, which are transported to and within manufacturing locations to be combined into finished goods or into assemblies or sub-assemblies thereof. These parts are frequently transported in bins, where they may be loose, having random locations and orientations. Parts must be transferred from the bins to a destination to facilitate the use of the part in the manufacturing process.

For many parts, the current technique of moving parts from their transport bins is a manual process. Special considerations are required in moving large parts. For example, stamped metal parts are picked by a human from a bin and placed into a fixture for further processes (e.g., cutting, welding, adhesion, painting). After processing, the human may pick the parts from a fixture and place them into a bin, which may be a new bin or the same bin from which the parts originated. During the pick/place operations, the human may also perform quality checks on the part.

In another example, the process of loading vehicle fascias onto paint bucks, or racks used in paint processes, requires a crew with members that may alternate between picking from the walk-in bin (at floor level) and placing the parts in a buck (at hip level) and who may also transfer the parts to one another in order to relieve the ergonomic stressors.

In this way, each part that enters the manufacturing process requires a manual operation of picking and placing the part at a destination location and orientation that is suitable for the next step in the manufacturing process. Heavy parts cause fatigue in the humans who perform these operations. Repetitive motions may contribute to costly injuries. These manual operations may introduce delays and inefficiencies to the overall assembly line process.

SUMMARY

A conveyance system and method for automatically moving one or more parts between a bin at a source location and a destination using a robot is provided. The system includes a first vision system to identify a part within the bin and to determine the pick location and pick orientation of the part. A second vision system determines the location and orientation of a destination. A controller plans the best path for the robot to follow in moving the part between the pick location and the destination. An end effector is attached to the robot for picking the part from the bin and holding the part as the robot moves the part to the destination. The end effector then releases, or places the part at the destination location and with a destination orientation.

The method includes the steps of identifying a part having a non-fixed location and orientation within the bin using a first vision system; determining the pick location and pick orientation of the part within the bin using the first vision system; and determining the location and orientation of a destination using a second vision system. The method also includes the step of performing adaptive trajectory planning to determine the best path between the pick location and the destination.

The method proceeds with the steps of picking the part from the pick location by the end effector on the robot; moving the part along the best path by the robot; placing the part at the destination by the end effector on the robot. The method may also include the step of checking the part for quality by one or both of the vision systems.

Employing the aspects disclosed herein, a system and method may automatically move one or more parts between a bin at a source location and a destination using a robot with an end effector. The flexible fixtures disclosed herein allow for a variety of part types to be moved from a bin where they may be loose, having random locations and orientations. Further, due to the automated nature of the methods discussed herein, gains in efficiency and resource reduction are achieved.

DESCRIPTION OF THE DRAWINGS

The detailed description refers to the following drawings, in which like numerals refer to like items, and in which.

DETAILED DESCRIPTION OF THE EXAMPLE EMBODIMENTS

Figure 1:
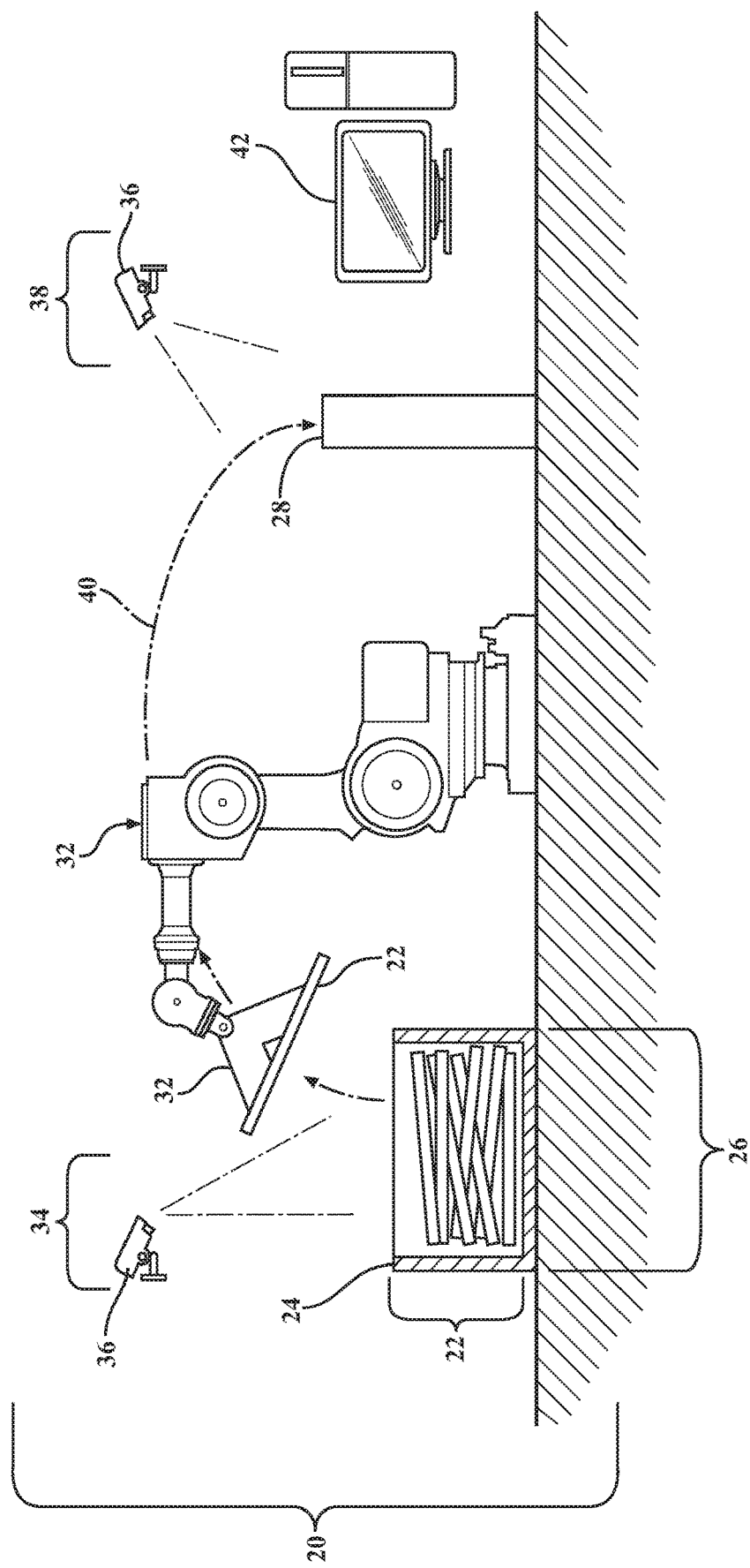
FIG. 1 is a schematic diagram of a system for automatically moving one or more parts between a bin at a source location and a destination.

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of each" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g., XYZ, XZ, YZ, X). Throughout the drawings and the detailed description, unless otherwise described, the same drawing reference numerals are understood to refer to the same elements, features, and structures. The relative size and depiction of these elements may be exaggerated for clarity, illustration, and convenience.

Referring to the FIGURES, wherein like numerals indicate corresponding parts throughout the several views, a conveyance system 20 and method for automatically moving one or more parts 22 between a bin 24 at a source location 26 and a destination 28 using a robot 30 with an end effector 32 are disclosed.

The conveyance system 20 is shown in FIG. 1 for automatically moving one or more parts 22 between a bin 24 at a source location 26 and a destination 28 using a robot 30 with an end effector 32, and where the parts 22 may be loose or not fixed in specific locations in the bin 24. As used in this disclosure, a bin 24 may include any box, rack, tray, or other carrier for holding parts 22. It should be appreciated that the term "part" 22 as discussed throughout the subject disclosure, including the claims, may encompass various types of objects including, but not limited to, raw materials, housings, component pieces in any stage of manufacture, assemblies or sub-assemblies in any stage of construction, and finished pieces or assemblies. A variety of different parts 22 may be accommodated and moved by the same conveyance system 20, using the same or different end effectors 32.

A first vision system 34 identifies a part 22 within the bin 24 and determines a pick location a pick orientation of the part 22. A second vision system 38 determines the location and orientation of a destination 28, which may be inside or outside of the bin 24. The destination 28 may be any place where one or more parts are to be moved, including, for example: fixtures or carriers for manufacturing or inspection, shipment, etc.; racks or packages for storage or conveyance; conveyors; fixtures or assemblies in any stage of manufacture. The destination 28 may be fixed in position and orientation. The destination 28 may be variable in position and/or orientation, such as for parts being placed on an assembly as it moves along an assembly line. Additionally, the destination 28 for each of a series of parts 22 may be different, for example in cases where a rack, or other such assembly is loaded with a plurality of parts 22, with each part 22 in a separate compartment or location on the rack.

Each of the vision systems 34, 38 may be any type of machine vision system, including one or more cameras 36 or other imaging devices and including but not limited to 2D, 2.5D, and 3D systems capable of identifying and locating a part 22 in 3-dimensional space, having x, y, and z coordinates, as well as a 3-dimensional orientation of roll, pitch, and yaw. One example of such a machine vision system is the camera system manufactured by Cognex. Such identifying and locating may be done using direct observations and measurements, through comparisons with one or more reference images, through any other method or combination of methods.

The conveyance system 20 includes a robot 30 having an end effector 32 to pick the part 22 from the bin 24, move the part 22 along a path 40, and place the part 22 at the destination 28. The end effector 32 may be an advanced effector (e.g., tooling), or any other effector capable of moving a part including, but not limited to, a grasp, clamp, and a suction device. The system also includes a controller 42 for planning a best path 40 for the robot 30 to follow in moving the part 22 between the pick location and the destination 28.

The present disclosure also provides a method for automatically moving one or more parts 22 between a bin 24 at a source location 26 and a destination 28 using a robot 30 with an end effector 32. The method includes the steps of identifying a part 22 having a non-fixed location and orientation within the bin 24 using a first vision system 34; determining the pick location and pick orientation of the part 22 within the bin 24 using the first vision system 34; and determining the location and orientation of a destination 28 using a second vision system 38. The method also includes the step of performing adaptive trajectory planning to determine the best path 40 between the pick location and the destination 28. According to an aspect, the step of performing adaptive trajectory planning may include the sub-steps of planning a plurality of possible paths 40 between the pick location and the destination incorporating geometrical information of the robot and pick location and the pick orientation and the target location and the target orientation; and determining a best path 40 between the pick location and the destination 28 by simulating the plurality of possible paths 40 between the pick location and the destination 28. One example of such an active trajectory planning is ROS (Robotic Operating System).

The method proceeds with the steps of picking the part 22 from the pick location by the end effector 32 on the robot 30; moving the part 22 along the best path 40 by the robot 30; placing the part 22 at the destination 28 by the end effector 32 on the robot 30. The method may also include the step of checking the part 22 for quality by one or more of the first vision system 34 and the second vision system 38.

According to an aspect, the destination 28 may have a fixed position and orientation. According to another aspect, the destination 28 may have a varying position, and/or orientation or one which is not fixed in space.

According to an aspect, the first vision 34 system may be a 2D vision system and the method further comprises the step of comparing by the first vision system 34 an image of the part 22 to a reference image to determine the pick location and pick orientation. According to another aspect, the first vision system 34 may be a 3D vision system, which may be capable of directly determining the pick location and pick orientation.

According to an aspect, the second vision system 38 may be a 2D vision system and the method further comprises the step of comparing by the second vision system 38 an image of the part 22 to a reference image to determine the location and orientation of the destination 28. According to another aspect, the second vision system 38 may be a 3D vision system, which may directly determine the location orientation of the destination 28.

Obviously, many modifications and variations of the present invention are possible in light of the above teachings and may be practiced otherwise than as specifically described while within the scope of the appended claims.

What is claimed is:

1. A system for automatically moving one or more parts comprising:
   a first vision system configured to identify and to determine a pick location and pick orientation of a part having a non-fixed location and orientation within a bin at a source location;
   a second vision system configured to determine a location and orientation of a destination;
   a robot having an end effector configured to pick the part from the bin and to move the part to the destination; and
   a controller programmed to simulate a plurality of possible paths between the pick location and the destination incorporating geometrical information of the robot and the pick location and the pick orientation and the target location and the target orientation; and
   wherein the controller is further programmed to determine, from the plurality of possible paths, a best path for the robot to follow in moving the part between the pick location and the destination.

2. The system as set forth in claim 1, wherein the part having a non-fixed location and orientation within the bin has a random location and orientation within the bin.

3. The system as set forth in claim 1, wherein the destination is within the bin at the source location.

4. The system as set forth in claim 1, wherein the destination is outside of the bin at the source location.

5. The system as set forth in claim 1, wherein the first vision system includes two or more cameras.

6. The system as set forth in claim 1, wherein the second vision system includes two or more cameras.

7. The system as set forth in claim 1, wherein at least one of the first vision system or the second vision system is a 2.5D system.

8. The system as set forth in claim 1, wherein at least one of the first vision system or the second vision system is a 3D system.

9. The system as set forth in claim 1, wherein at least one of the first vision system or the second vision system is a 2D system.

10. The system as set forth in claim 1, wherein the end effector comprises a grasp.

11. The system as set forth in claim 1, wherein the end effector comprises a suction device.

12. A method for automatically moving one or more parts between a bin at a source location and a destination comprising:
    identifying a part having a non-fixed location and orientation within the bin using a first vision system;
    determining the pick location and pick orientation of the part within the bin using the first vision system;
    determining the location and orientation of a destination using a second vision system;
    simulating a plurality of possible paths between the pick location and the destination incorporating geometrical information of the robot and the pick location and the pick orientation and the target location and the target orientation;
    determining a best path between the pick location and the destination from the plurality of possible paths;
    picking the part from the pick location by an end effector on a robot;
    moving the part along the best path by the robot; and
    placing the part at the destination by the end effector on the robot.

13. The method as set forth in claim 12, wherein identifying a part having a non-fixed location and orientation within the bin using a first vision system further includes identifying a part having a random location and orientation within the bin.

14. The method as set forth in claim 12, wherein identifying a part having a non-fixed location and orientation within the bin using the first vision system further includes comparing an image of the part with one or more reference images.

15. The method as set forth in claim 12, wherein determining the pick location and pick orientation of the part within the bin using the first vision system further includes comparing an image of the part with one or more reference images.

16. The method as set forth in claim 12, further comprising:
    checking the item for quality by one of the first vision system or the second vision system.

17. The method as set forth in claim 16, further comprising:
    checking the item for quality by both of the first vision system and the second vision system.

* * * * *